Aug. 23, 1938.  A. L. EMENS  2,127,505
ELECTRIC METER
Filed Feb. 29, 1932   2 Sheets-Sheet 1
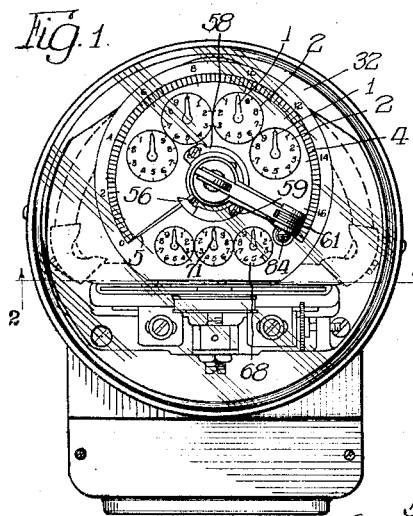
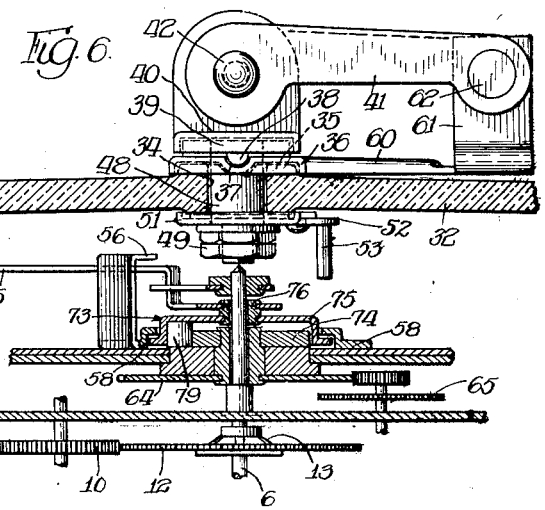
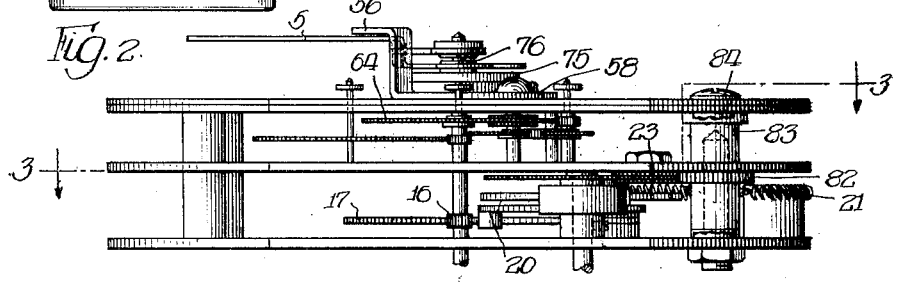
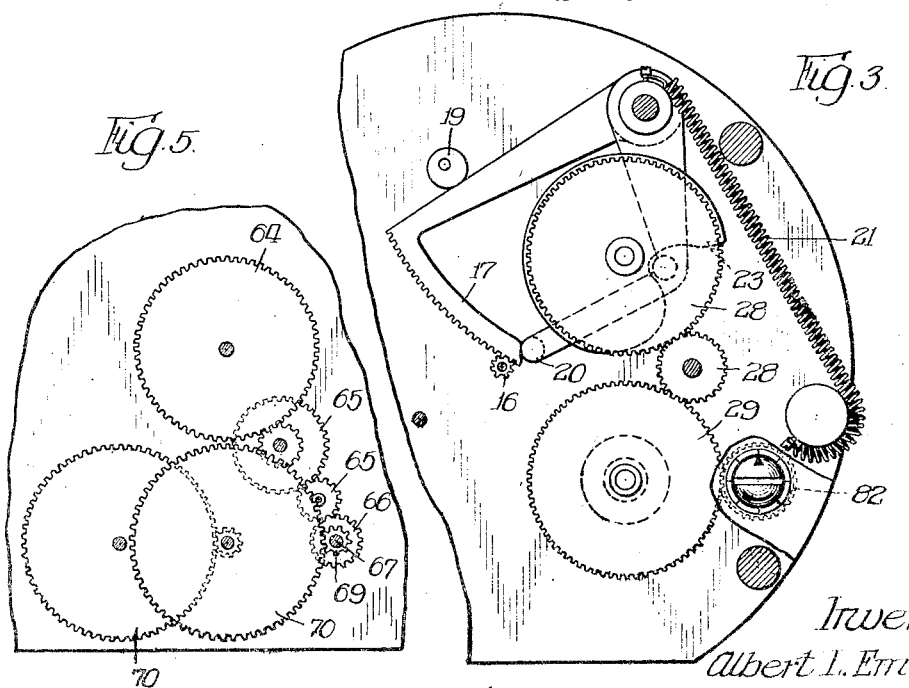
Inventor
Albert L. Emens.
By Wilkinson, Huxley, Byron & Knight Aug. 23, 1938.     A. L. EMENS     2,127,505
ELECTRIC METER
Filed Feb. 29, 1932     2 Sheets-Sheet 2
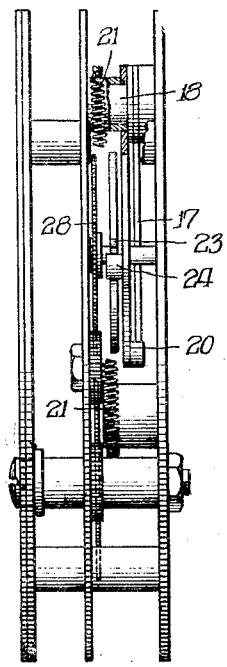
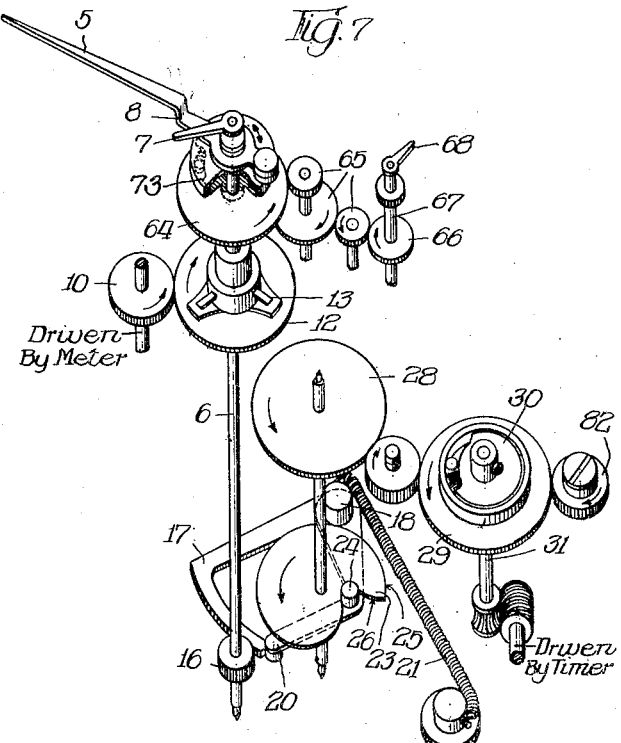
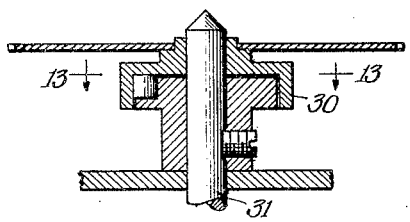
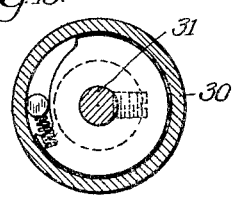
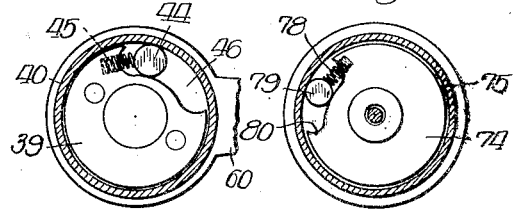
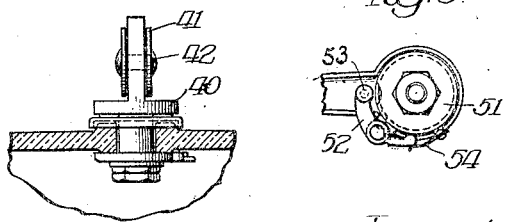
Inventor
Albert L. Emens,
By Wilkinson, Huxley, Byron & Knight
Attys.

Patented Aug. 23, 1938

2,127,505

UNITED STATES PATENT OFFICE 2,127,505

ELECTRIC METER

Albert L. Emens, La Fayette, Ind., assignor to Duncan Electric Manufacturing Company, La Fayette, Ind., a corporation of Illinois Application February 29, 1932, Serial No. 595,804

3 Claims. (Cl. 171—34)

This invention relates to electric meters, and especially to the type known as maximum demand meters, although in some of its aspects it may be used for other purposes. A maximum demand meter of the type chosen for the illustration of this invention includes in addition to such ordinary killowatt hour meter features as may be used, a device for indicating the greatest demand in any period of a given length. For example, besides having the usual features for indicating the total kilowatt hours used during the month, the maximum demand meter may have a pointer which indicates the greatest amount of energy used in any fifteen-minute period during the month.

It should be understood that one purpose of a maximum demand meter is to enable the power company to more equitably bill its customers, since the consumer who uses only a small amount of current each month, but who occasionally has an excessive demand, requires the company to have expensive facilities for meeting his demand. In other words, the demand register enables the power company to bill the consumers not only according to the amount of current they use, but also according to their proportionate share of the overhead involved in providing equipment for meeting the peak demand, and in providing the necessary transmission facilities for his own individual maximum demand.

The maximum demand indicating function may be performed by providing a needle which is automatically snapped back to zero every fifteen minutes. It follows that the movement of that needle by the meter disk during any period (for example, fifteen minutes) will indicate the demand in that period. This snap-back demand needle may move another pointer, called the sweephand, which is not returned to zero, but remains at the highest point to which said snap-back demand needle was moved. Thus, if during the first fifteen-minute period the snap-back demand needle shoved the maximum demand needle or sweephand around to the numeral 10, and was then set back to zero, it would not again move the maximum demand meter during any period in which the demand was less than the ten units indicated by the first period. However, if in a later period the demand should be, for example, 12 units, then in that period the snap-back demand needle would move around to the point 12 shoving the sweephand from 10 to 12. When the meter reader comes around he can see from the position of the maximum demand needle the furthest point to which the snap-back demand needle had been moved during the month. According to former practice, the reader would record the position of this sweephand (with an accuracy depending upon his honesty and carefulness) and would reset the sweephand to zero so that the process would begin over again.

According to the present invention, the maximum demand is registered permanently in a manner to substantially eliminate the difficulties due to dishonesty or careless reading of the demand indications. Not only are the rights of the company thus protected, but the consumer is much better satisfied, since otherwise there is a strong tendency for him to feel that perhaps he is being overcharged.

Occasionally it is necessary to inspect and test the meters, and when this is done it has been necessary in the past for the inspector to be present at the end of the regular fifteen-minute period in order to check the snap-back of the snap-back needle to zero. If the inspector should start to check this feature at the beginning of the fifteen-minute period, it has formerly been necessary for him to wait the full fifteen minutes.

According to one aspect of this invention, the necessity for this wait is avoided by providing means whereby the inspector may readily turn the mechanism up manually to end the period ahead of time, just as a clock inspector might turn the hands of a clock ahead to the hour in order to check the chimes. In the present instance, however, there would be no undesirable results from this setting up.

In its preferred form, this invention includes a reset lever for turning the sweephand back to zero, an integrator which is operated by this sweephand when it is being set back, and one-way clutches which prevent the sweephand from operating said integrator while it is being turned forward by the meter disk, and for preventing the turning of the re-set lever in the wrong direction. This renders the device substantially foolproof, for when the meter reader has once displaced the re-set lever, it is necessary for him to turn it a complete revolution in order to get it back to its sealing position, and in so doing, the meter reader must turn the sweephand all the way back to zero, and he cannot turn it forward.

As a further safeguard, a counter may be used which will count the number of times that the re-set lever is operated. This would have the added advantage that it would permit a determination from the face of the meter at any time of the average demand since the cumulative integrator was last set to zero.

In another aspect the preferred form of the invention comprises the use of an over-running clutch in the timing mechanism so that this mechanism may be set up without interference with the timing motor, but wherever it is set the motor will immediately begin to function. In this connection, there are added advantages in that the set-up device will indicate that the timer is in operation, and may be calibrated in minutes both to aid the operator in setting it up and to provide a handy timing device for various meter testing purposes.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts, Figure 1 is a front elevation of a meter embodying this invention;

Figure 2 is a view of certain parts of the mechanism taken along the line 2—2 of Figure 1;

Figure 3 is a fragmentary sectional view taken substantially along the line of line 3—3 of Figure 2;

Figure 4 is a side view partly in section, of the structure shown in Figure 3;

Figure 5 is a fragmentary front sectional view illustrating the cumulative demand recording features;

Figure 6 is a detail view of the re-set mechanism and its means for operating the cumulative demand integrator;

Figure 7 is a diagrammatic view illustrating various operative features of this invention;

Figures 8 and 9 are detail views of the re-set device; and

Figures 10, 11, 12 and 13 are detail views of the over-running clutches, Figure 10 relating to the reset mechanism, Figure 11 to the cumulative demand integrator drive, and Figures 12 and 13 to the drive for the snap-back mechanism.

Although my invention may take many forms, only one has been chosen for illustration. This form is embodied in an electric meter, as shown in Figure 1. This meter may include the usual hands 1 and dial calibrations 2 for indicating the total kilowatt hours measured by the meter. In addition to this there may be the usual demand calibrations 4 with the maximum demand indicating needle 5, more commonly called the sweephand, and the mechanism for operating the same. It is in connection with this mechanism that this invention is preferably used. This mechanism is best illustrated diagrammatically in Figure 7. The sweephand 5 is rotatably mounted on the shaft 6 and is actuated by a member 7 which may for convenience be termed the snap-back needle. This snap-back needle is keyed to the shaft 6, and co-acts with an upright portion 8 in the sweephand 5. The shaft 6 is driven by any suitable gear 10, which is driven by the electric meter disk in the same manner as are the pointers 1 of the power consumption indicator. This gear 10 meshes with the gear 12 which drives the shaft 6 through the friction clutch 13. This clutch 13 slips with comparatively light friction, so that when the shaft is snapped back by being turned counterclockwise back to the zero indication the shaft 6 will also turn without injurious resistance.

In order that the sweephand 5 may indicate the maximum demand during any fifteen-minute period between meter readings, means are provided to set the snap-back needle 7 back to zero every fifteen minutes. Of course the period may be other than fifteen minutes, but for the sake of simplicity of discussion this description will throughout be based on the fifteen-minute period. The snap back of the snap-back needle 7 is accomplished through the pinion 16, on the shaft 6 and the pivoted rack 17 mounted on the pin 18. The snap-back action is stopped at the zero position by the eccentric 19 which limits the return movement of rack 17. A snap-back lever 20 actuated by the spring 21, and also pivoted on the pin 18 together with a cam 23 for controlling the snap-back lever 20, and the means for operating said cam, is provided. As the driving gear 10 turns the shaft 6 and the snap-back needle 7 in a clockwise direction, it also turns the pinion 16 likewise, swinging the rack 17 to the right. This movement of the rack is not normally resisted by the snap-back lever 20 since the cam 23 has pressed the snap-back lever 20 out of range of the rack 17. This cam is driven constantly by means to be described, and when it has made a complete revolution in the direction of the arrow the cam follower 24 on lever 20 is released from the rim 25 of the cam and under the force of the spring 21 falls into the notch 26 in the cam, pressing the rack 17 back to its starting position, which position is the zero position for the snap-back needle 7.

The cam 23 is driven through a train of gears 28 by the gear 29. The gear 29 is driven by the shaft 31 through a one-way clutch 30 (to be described). The shaft 31 is preferably driven by a self-starting synchronous motor, such as that used in electric clocks.

The meter is preferably sealed in any suitable manner, visibility of the apparatus being permitted by the glass cover 32 in the usual manner. This glass cover is provided with a hole 34 coaxial with shaft 6 through which is fitted the set-back mechanism. Around the hole 34 are formed suitable glass bosses 35. Over the upper boss is applied a cap 36 which is provided with a depressed portion 37 which fits into notches in the glass boss, and into which may be fitted a lug 38 on a stationary clutch member 39. This member may be shaped substantially as shown in Figure 10. Fitting over this stationary clutch member 39 is a movable clutch member 40 to which is pivoted a handle 41 about the horizontal pivots 42. As shown in Figure 10 there is located between the stationary clutch member 39 and the movable clutch member 40, a clutch roller 44 which is normally pressed by a spring 45 toward the narrow end of a clutch slot 46 formed in the stationary clutch member, as shown. It is evident that a movement of the movable clutch member 40 in a clockwise direction would only tighten the clutch roller 44 so that this movement is prevented. A rotation of the movable clutch member 40 in a counterclockwise direction, however, loosens the roller 44, whereby the free rotation of the movable clutch member is permitted.

The parts are held in the position described by a stud 48 and the nuts 49. This stud 48 is of course rigidly secured to the outer clutch member 40 and is turned with it by the set-back lever 41. Keyed to the stud 48 but on the inside of the glass cover 32 is a set-back disk 51 (Fig. 9)

to which is pivoted the lever 52 carrying at one end a set-back pin 53, and being acted upon at the other end by a spring 54 which tends to press the set-back pin outwardly. In its outer position the set-back pin 53 engages the sweephand just outside the vertical portion 8. It follows that when the lever 41 is turned the pin 53 will strike the sweephand 5 and turn the same counterclockwise until it is released therefrom. The release is accomplished by means of a cam 56 which, as shown best in Figure 1, is so shaped as to press the set back pin 53 inwardly and cause its release from the sweephand.

It may be noted at this point that various dials used for different meter purposes may have the zero point for the sweephand at slightly different positions. In order to cause the release of the sweephand at the zero position, the cam 56 is made adjustable by supporting it from a ring 58 which is secured by screws 59 extending through slots in the usual manner. However, this can be dispensed with by forming as a cam the portion of the sweephand engaged by pin 53, so that when the sweephand is stopped at the zero position by the snap-back needle, the cam surface on the needle will become effective to overcome the spring 54 and press the pin 53 inward to enable it to slip free of the sweephand 5.

As has previously been common practice, it is desirable to seal the re-set mechanism in an inactive position so that it may not be tampered with. In the present instance this is accomplished by means of an arm 60 which has an upstanding lug 61 extending from and preferably integral with the cap 36 which as previously described is locked against rotary motion by the depressed portion 37 which fits into a corresponding notch in the glass boss 35. The lug 61 and the set-back lever 41 are perforated, as indicated at 62, so that when these parts are in the position shown in Figure 6 a wire may be passed through them and sealed with the customary lead seal. In the present invention this locking together has an additional advantage in that it requires the meter reader to make a complete set-back operation. Inasmuch as the one-way clutch roller 44 prevents rotation of the set-back lever 41 except in a counterclockwise direction, it is impossible for a meter reader after he has once unsealed the lever 41 and started turning it, to again seal it until he has turned it through a complete revolution. The set-back pin 53 is so related with respect to the locking position of the set-back lever 41 that when the lever is locked the set-back pin is in an inactive position at the bottom part of its cycle, that is, between the cam 56 and the furthest point of movement of the sweephand. This insures a complete reset of the sweephand to zero when the reset lever 41 is turned one revolution.

In meters formerly known commercially, the re-setting of the sweephand to zero left no record of what the sweephand had previously registered. Neither the customer nor the company would have any way of knowing whether or not the meter reader correctly read the demand indication. According to the present invention, however, these maximum demand indications are permanently and cumulatively registered every time the sweephand is re-set. The mechanism which applicant has devised for performing this is quite simple.

As illustrated diagrammatically in Figure 7, the sweephand in its return movement turns the gear 64 which, through a suitable train of gears 65 turns the gear 66 on the shaft 67 to which is secured the pointer 68. This train of gearing is also shown in Figure 5. From this figure it is seen that the shaft 67 also carries a pinion 69 which turns the gears 70 and their associated pointers 71 in the usual manner. Pointers 68 and 71 with their associated dial markings comprise a cumulative demand integrator.

It has previously been recognized as desirable that a minimum of power to be used in operating an electric meter. For this reason, it is preferred that the sweephand 5 be operated freely in its movement by the meter, leaving the operation of the pointers 68 and 71 to the return stroke of the sweephand 5. To accomplish this the one-way clutch mechanism 73 is provided. This mechanism comprises an inner clutch member 74 rigidly connected to the gear 64 and with it freely rotatable on the shaft 6. Around the inner clutch member 74 is the outer clutch member 75 which, as shown best in Figure 6 is rigidly secured to the sweephand 5 by means of the collar 76 which is rotatably mounted on the shaft 6. This outer clutch member 75 constitutes a housing and together with the inner clutch member 74 forms a clutch raceway 80 in which is carried the roller 79 actuated toward the small end of the raceway by the spring 78. Due to the nature of this over-running clutch the hand 5 may be turned freely in a clockwise direction by the meter mechanism, but when it is turned counterclockwise in resetting, it causes the clutch to engage, and therefore turns the gear 64. Turning of the gear 64 in a counterclockwise direction, through the train of gears 65 causes the pointer 68 to turn in a clockwise direction. The ratio in the train of gears 65 is such that the resetting of sweephand 5 turns the integrator including pointer 68 through a number of graduations corresponding to the number of graduations through which the sweephand 5 is rotated. In other words, if the sweephand 5 has been moved to the position 12 on its scale, the resetting of the sweephand to zero will add 12 to the reading of the pointers 68 and 71. It is therefore substantially impossible for the meter reader to falsify the demand readings without detection, since he will read the cumulative total of the pointers 68 and 71, rather than, or as well as the position of the sweephand 5. Of course, the difference between the reading of the integrator including the pointers 68 and 71 before and after a given re-setting of the sweephand 5, will indicate the reading of the sweephand prior to the said re-setting.

As a further safeguard against improper operation, and for other purposes, a counter may be provided for registering the number of times the re-setting mechanism has been operated. It is evident that a simple division of the increase in reading of the needles 68 and 71 by the increase in the total number of re-set operations on such a counter will give the average of the various demand readings during a given period.

As previously stated, it is sometimes desirable to inspect and test the meter, such an inspection should include a check up on the snap-back operation of the snap-back needle 7. However, this snap-back occurs only when the cam 23 is in the position shown. In prior commercial devices, this cam was driven directly by a synchronous electric motor, with the result that there was no way to hurry the occurrence of the snap-back. According to the present invention, the over-running or one-way clutch 30 is provided between the shaft 31 and the gear 29. This permits the gear 29 to be turned even though the motor or the gearing associated with the same (not shown) prevents the turning of the shaft 31. Means are provided for conveniently turning the gear 29, this means comprising the pinion 82 meshing with the gear 29 and keyed to the shaft 83, which is suitably journaled, as shown. The shaft 83 is provided with an extension having a head 84 projecting to the front of the meter dial and provided with a slot for a screw driver, as shown best in Figures 2 and 3. This permits the turning of the cam 23 by a screw driver applied to the head 84, so that the meter tester may quickly turn the cam to the position at which the snapback takes place.

As a matter of further convenience this head 84 is provided with an arrow to indicate its proper direction of rotation, and a pointer which may point to suitable calibrations on the dial, as shown in Figure 3, which calibrations may indicate minutes or other intervals of time. This will not only aid the tester in knowing the position of the cam 23, but it will also provide a convenient timer for any other purpose. In order to prevent tampering with the head 84 it is located underneath the glass cover 32, but this is not objectionable, as the head 84 is turned by hand only during testing, at which time the cover 32 is removed for other reasons. The meter reader need never remove the cover, since the set-back lever 41 is on the outside of the cover, and since the friction clutch 13 permits the setback of the sweephand 5 and the snap-back needle 7 to the zero position regardless of the position of the cam 23.

In view of the foregoing description, the operation need only be briefly reviewed. During the ordinary running of the meter the snapback needle 7 is rotated clockwise by the meter drive, shifting the sweephand 5 ahead of it for successive periods of say fifteen minutes each. At the end of each period the snap-back needle 7 is set back to zero through operation of the rack 17 of the spring pressed lever 20, as it is released by the cam 23, the cam 23 being constantly rotated, preferably by a suitable synchronous motor. When the meter is read, the setback lever 41 is unsealed and lifted from the lug 61 and rotated in a counterclockwise direction to sweep the sweephand 5 back to zero. When the hand reaches this position, the lever 41 is released from its co-action with the hand by the pressing in of the peg 53 under the influence of the cam 56. The lever 41 is then again sealed to the lug 61. As the sweephand 5 was rotated counterclockwise as above described, it turned the gear 64 through the medium of the one-way clutch 73 and this gear 64 through suitable other gears turned the pointers 68 and 71 an amount corresponding to the amount that the sweephand was set back, i. e., an amount corresponding to what had been the reading of the sweephand.

The meter reader can make sure that the synchronous motor is operating by merely glancing at the head 84 which will be rotated by the motor. This head 84 may also be turned with a screw driver after the case 32 has been removed, in order to rotate the cam 23 to the position which permits the snap-back of the snap-back needle 7, thus rendering the inspection of this feature quite simple.

It should be realized, of course, that if desired, means may be provided for rendering the setback operation automatic, so that manual operations by the meter reader will be entirely unnecessary, and so that the meter reading of the definite time of the set-back may be taken any time prior to the next automatic set-back. When this is done, it may also be desirable to provide an extra integrator operative in conjunction with the integrator including pointers 1, and set back to zero whenever the snap-back needle is set back, so that the reading of the total power consumption may be made at any time, as of the last automatic set back. Under these conditions, the reading at the time of the last set-back can at any time be determined by subtracting the reading of the auxiliary integrator just mentioned from the reading of the pointers 1.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. An electric maximum demand meter including a pusher element, means constantly tending to move said pusher element forwardly in proportion to the power consumption, snapback means for causing the return of said pusher element after the lapse of a given period, and manually operable means for causing the operation of said snap-back means in advance of its schedule; said manually operable means having a portion visible during ordinary meter readings, said part being rotated by said return means in its normal operation, whereby the meter reader can readily see whether or not said first named means is in operation.

2. An electric maximum demand meter including a pusher element, means constantly tending to move said pusher element forwardly in proportion to the power consumption, snapback means for causing the return of said pusher element after the lapse of a given period, and manually operable means for causing the operation of said snap-back means in advance of its schedule; said manually operable means having a portion visible during ordinary meter readings, said part being rotated by said snap-back means in its normal operation whereby the meter reader can readily see whether or not said first named means is in operation, and indicating means associated with said visible moving portion to serve as a convenient measurer of time.

3. An electric maximum demand meter including a pusher element, means constantly tending to move said pusher element forwardly in proportion to the power consumption, snapback means including a snap-back release member for causing the return of said pusher element after the lapse of a given period, and manually operable means for causing the operation of said snap-back release member in advance of its schedule; said snap-back means including a normal source of power continuously operating at constant speed, and mechanical means directly driven by said source of power and directly driving said snap-back release member including a one-way drive between said source of power and said driven release member which is constructed to allow said driven release member to be driven faster than its normal speed without altering the natural movement of the normal source of power.

4. An electric maximum demand meter including a meter mechanism and a case for said mechanism adapted to be sealed against tampering, said mechanism including a pusher element, means constantly tending to move said pusher element forwardly in proportion to the power consumption, return means for causing the snap back of said pusher element after the lapse of a given period, manually operable means for causing the operation of the effective part of said snap-back means in advance of its schedule; said snap-back means including a normal source of power, and a one-way drive arranged to permit the movement of the part thereof operated by said manually operable means while the natural movement of the normal source of power is maintained; said manually operable means being connected to drive said effective part and located in a position to be readily accessible when said casing is opened but inaccessible within said casing when said casing is closed and sealed.

5. An electric maximum demand meter including a pusher element, means constantly tending to move said pusher element forwardly in proportion to the power consumption, snap-back means for causing the snap back of said pusher element after the lapse of a given period, and manually operable means for causing the operation of said snap-back means in advance of its schedule; said manually operable means having a portion visible during ordinary meter readings, said part being rotated by said snap-back means in its normal operation whereby the meter reader can readily see whether or not said first named means is in operation, and calibrations associated with said visible moving portion to serve as a convenient measurer of time and aiding the tester in determining the proximity in time of the next snap back operation.

6. An electric maximum demand meter having a case and including within the case an angularly movable pusher element, means constantly tending to move said pusher element forwardly in proportion to the power consumption, spring operated means for causing the return of said pusher element to its starting point after the lapse of a given period, maximum demand indicating means operated by said pusher element to a position corresponding to its greatest movement, and including a shoulder movable arcuately through less than 360°; and reset means including a member within the case movable through a cycle of 360° and engaging said shoulder during part of said cycle to return said indicating means to its zero position, and movable during a subsequent part of its cycle to a position of rest angularly outside of the angular movement of said shoulder; an integrator operated by said indicating means as it is set back to zero to indicate exactly the amount of its set-back movement.

7. An electric demand meter comprising a meter mechanism including a pusher element for indicating independently the demand in successive periods, means for causing a return of said pusher element at the end of each such period, a sweephand operated by said pusher element to the point of its greatest movement, a cover for said meter mechanism, a re-set device rotatably carried by the cover and the operation of which is necessary for setting back said sweephand to zero, an integrator operated by said sweephand in its setting back movement to indicate the extent of said movement, means for sealing said re-set device in an inactive position, and one-way movement means including a first member immovably secured to the cover, a second member rotatable with the device and at a fixed angular position with respect to the device, a one-way locking element carried by one of said members, and a spring urging the locking element into engagement with the other of said members one of said elements being so notched where it is engaged by the locking element as to positively prevent movement of said device except in the resetting direction, while permitting movement in the resetting direction, and means for causing the release of said re-set device from said sweephand when said sweephand reaches the zero position.

8. An electric demand meter comprising a meter mechanism including a pusher element for indicating independently the demand in successive periods, means for causing a return of said pusher element at the end of each such period, a sweephand operated by said pusher element to the point of its greatest movement, a cover for said meter mechanism, a re-set device rotatably carried by the cover and the operation of which is necessary for setting back said sweephand to zero, an integrator operated by said sweephand in its setting back movement to indicate the extent of said movement, said re-set device including a handle external of the cover and a sweephand-engaging member positioned inside the cover and rotatable with the handle at a fixed angular position with respect to the handle, means for sealing said re-set device in a single position in which position the sweephand-engaging member is out of the range of movement of the sweephand, and one-way movement means including a first member immovably secured to the cover, a second member rotatable with the handle and at a fixed angular position with respect to the handle, a one-way locking element carried by one of said members, and a spring urging the locking element into engagement with the other of said members one of said elements being so notched where it is engaged by the locking element as to positively prevent movement of said handle except in the resetting direction, while permitting movement in the resetting direction, and means for causing the release of said re-set device from said sweephand when said sweephand reaches the zero position.

ALBERT L. EMENS.